April 15, 1947.            J. R. MILES                2,419,151
EYEPIECE UNIT FOR TELESCOPIC SYSTEMS OF THE CLASS INCLUDING BINOCULARS
Filed June 30, 1944

INVENTOR.
John R. Miles.
BY Charles M. Funkhouser
ATTORNEY

Patented Apr. 15, 1947

2,419,151

UNITED STATES PATENT OFFICE 2,419,151

EYEPIECE UNIT FOR TELESCOPIC SYSTEMS OF THE CLASS INCLUDING BINOCULARS

John R. Miles, West Englewood, N. J., assignor to Bendix Aviation Corporation, Teterboro, N. J., a corporation of Delaware Application June 30, 1944, Serial No. 542,853

16 Claims. (Cl. 88—57)

The present invention relates to eyepiece units for visual use with instruments, such as telescopes and binoculars.

This application is a continuation in part of application Serial No. 502,335, filed September 14, 1943, which it replaces, containing all of the subject matter of the original application and conforming matter only.

Eyepieces for use with optical instruments designed to focus upon images of distant objects formed by cooperating objectives, such as heretofore constructed and shown in the prior art, and make no provision for substantial correction of lateral color together with astigmatism and field curvature. Usually lateral color corrections are provided partially in the objective lens. With the present eyepiece, however, correction for such major aberrations is obtained in the eyepiece per se by a novel arrangement of selected glasses of calculated refractive values and thickness with different surface curvatures in novel axial position with respect to each other.

Accordingly, an object of the invention is to provide a novel eyepiece lens construction that corrects for major optical errors.

Another object is to provide a novel eyepiece adapted for optical instruments, such as telescopes and binoculars, whereby optical error corrections are substantially improved upon within the eyepiece, and so as to provide for the manufacture of smaller and lighter instruments having higher efficiency than prior instruments.

Another object is to provide a novel lens unit for optical instrument eyepieces, whereby optical errors are corrected by a novel combination and arrangement of elements including a doublet field lens, a plano-convex center crown lens and a doublet eye lens mounted in axial alignment, so as to bring the bundle of rays to a point in the region of the user's eye, 60% of edge bundle reaching the eye.

The above and other objects and advantages of the present invention will appear more fully hereinafter from a consideration of the detailed description and claims which follow, taken together with the accompanying drawings wherein one embodiment of the invention is illustrated. It is to be expressly understood, however, that the drawings are for the purpose of illustration only and are not designed as a definition of the limits of the invention. Reference for this latter purpose should be had to the appended claims.

Figure 1:
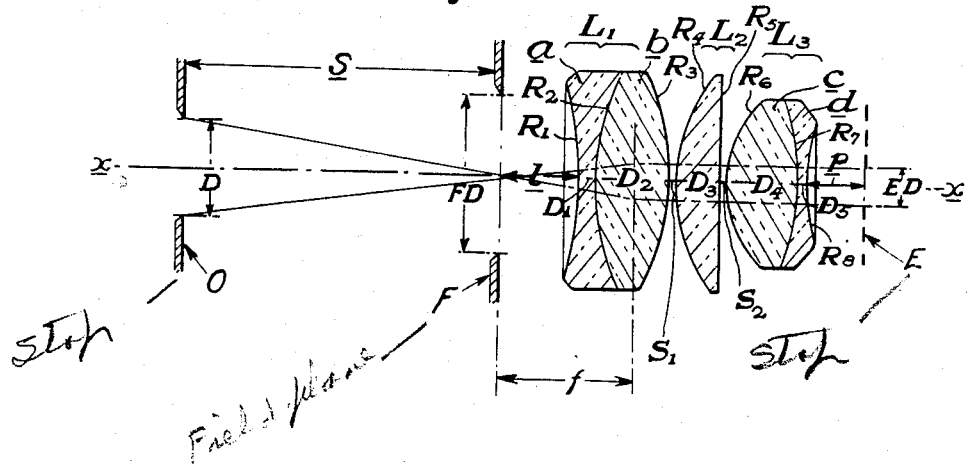

In the drawings, wherein like reference characters refer to like parts throughout the several views, Figure 1 is a side axial section view of the eyepiece lens construction and its stops to illustrate one embodiment thereof.

Figure 2:
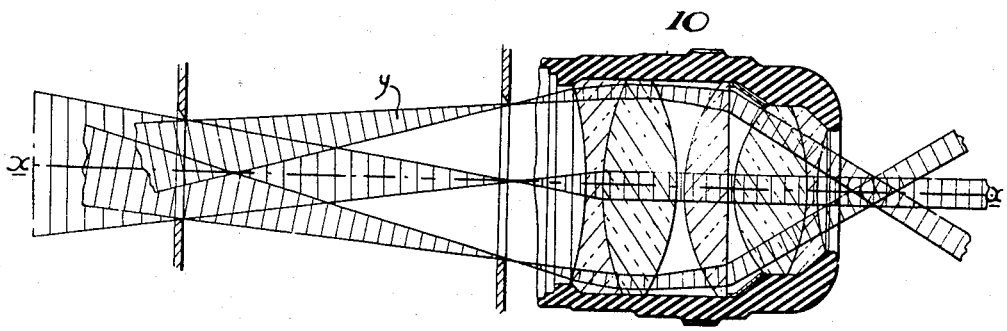

Figure 2 is a schematic diagrammatic view of the refracted ray bundles with relation to the same section view taken through the eyepiece axis.

The one embodiment illustrated includes a doublet field lens member $L_1$ consisting of lenses $a$ and $b$; a plano-convex center crown lens member $L_2$ and a doublet eye lens member $L_3$ consisting of lenses $c$ and $d$, designed and shaped according to the following formula, taking the unit as, e. g., one millimeter:

| Lens | | Radii | Thickness | Refractive index—$N_D$ | V |
|---|---|---|---|---|---|
| $L_1$ | $a$ | $R_1=-77.57$ | $D_1=4.19$ | 1.689 | 30.9 |
| | | $R_2=+44.41$ | | | |
| | $b$ | $R_2=+44.41$ | $D_2=15.11$ | 1.611 | 58.8 |
| | | $R_3=-31.33$ | | | |
| $L_2$ | | $R_4=+31.87$ | $S_1=0.4$ | | |
| | | $R_5=\infty$ | $D_3=8.77$ | 1.517 | 64.5 |
| | | | $S_2=0.4$ | | |
| $L_3$ | $c$ | $R_6=+21.23$ | $D_4=14.5$ | 1.517 | 64.5 |
| | | $R_7=-45.10$ | | | |
| | $d$ | $R_7=-45.10$ | $D_5=2.0$ | 1.689 | 30.9 |
| | | $R_8=+34.82$ | | | |

Possible apparent field=75° approximately. $V=(N_D-1)/(N_F-N_C)$ where D, F and C, respectively, are the standard yellow, blue and red Fraunhofer spectral lines. Equivalent focal length=23.26.

The above figures are for a telescopic eyepiece or the like in which the distance $s$ from the front aperture stop 0 to the image at the focal or field plane F is 63.07 units, the distance from the field plane F to the first lens vertex is 14.22 units, the distance $p$ from the last lens vertex to the exit pupil or stop E is 14.0 units. If as in this example the millimeter is the unit, the diameter ED of the "night" pupil is 7.053 millimeter. The ratio of the eyepiece's focal length to the practical maximum diameter of its first lens is 0.56.

From these values and the equivalent focal length $f=23.26$ units: then $s/f=63.07/23.26=2.71$, $f/ED=23.26/7.053=3.30$, and the diameter D of the objective stop is $D=2.71\times7.053=19.13$ units. The image, or field, linear diameter FD is 29.2 units for an apparent field of over 75°. As is obvious to one skilled in the art, the above defined shape may also be expressed in units for which $f=100$ by multiplying each dimensional numeric by $100/23.26=4.30$ for convenience of comparison with the art. However, the above millimeter unit was used in the specification as suitable for the binocular taken by way of example.

The functions of the parts

Doublet field lens $L_1$ serves four main functions, as follows:

1. To refract the bundle of rays $y$ back toward the axis $x$—$x$ so that it will be bent properly to get through the edges of the next two lens units $L_2$ and $L_3$, see Figure 2 showing an enclosing casing 10 for example;

2. To produce refractive power;

3. To aid in correcting the chromatic aberration, by the combination of the flint and crown lens elements $a$ and $b$ respectively;

4. And, due to its bending, to aid in correcting field curvature, astigmatism, distortion, and coma.

Lens $L_2$ serves three main functions, as follows:

1. To refract the bundle of rays toward the eye lens unit $L_3$, so that it will get through the edges of lens unit $L_3$;

2. To produce refractive power; and

3. To aid in the astigmatism, distortion, and coma correction.

Lens unit $L_3$, serves three main functions, as follows:

1. To aid in chromatic correction, as the combined elements $c$ and $d$ are of crown and flint respectively;

2. To aid in correcting both astigmatism, distortion and coma; and

3. To produce refractive power.

There is thus provided a novel eyepiece for optical instruments, such as telescopes and binoculars, adapted to materially aid corrections for lateral color error, astigmatism, distortion, field curvature and coma, for either a telescope or a binocular as to materially improve the corrections of the aberrations of all cooperating optical parts throughout the instrument, and also to permit the manufacture of smaller and lighter instruments of this class.

To obtain a large, evenly and brightly illuminated field with a given limited diameter of eyepiece requires that the objective be short in focal length and large in diameter which tends to produce a curved field which is round with respect to the objective and hollow with respect to the eyepiece. In a binocular, the diameter of each eyepiece is limited since, with its mounting, the diameter must be less than the interpupillary distance.

With such a binocular, a specialized erecting system is required which necessitates a further shortening of the front aperture stop distance $s$ since the stop's diameter has to be small and positioned approximately midway between the objective and the field stop to physically allow the insertion of the erecting system.

For a given magnifying power of the telescopic device, a short focal length of the objective requires a proportionally short focal length of the eyepiece. For a maximum size of field, the maximum possible diameter of eyepiece must be obtained. For good edge illumination, the requirement of a large ratio of diameter to focal length exists with the eyepiece much more than for the objective.

The conventional telescopic devices use a relatively long front aperture stop distance and a relatively small diameter of the front lens of the eyepiece both to avoid undesirably large aberrations and installation difficulties of erecting systems for binoculars. This conventional solution sacrificed both brightness of the edge of the field and adequacy of astigmatic correction.

The applicant went much further than is usually accepted as practical in using a very short stop distance and focal length. While staying within the limit of possible eyepiece diameter, this course enabled him to obtain the large ratio of diameter to focal length for the eyepiece necessary for brightness at the edge of a large field. To follow this course of using relatively large diameters required him to find some way to make the necessary large astigmatism and lateral color corrections. He alone accepted the challenge of creating such a corrected large diameter eyepiece and succeeded not only in obtaining, at the edge of a 75° apparent field, over 50% of the brightness at the center of the field but also in producing more than 70% diametral increase in the visually perfect portion of the apparent field and also appreciably increased the size of the visually satisfactory field as to color aberration and distortion without any significant effect on other aberrations, the basis of comparison being an Erfle eyepiece made by Zeiss, see U. S. Patent 1,478,704 to Erfle.

In achieving this improved performance with a normal objective, the eyepiece has full correction for distortion, and color aberrations not only at the center but also respectively at points at a radial distance from the center of approximately half, and three quarters of the semi-diameter of the field. It also has substantially constant angular magnification throughout the entire field, i. e., a substantially constant ratio of the apparent to the real angular separation, a constancy which facilitates an observer's correctness of judgment since it permits correct angular estimation or interpolation, which is of especial advantage in connection with observations of rapidly moving objects.

Although the present invention is only described and illustrated in detail for one embodiment thereof, it is to be expressly understood that the same is not limited thereto. Various changes may be made in design and arrangement of the eyepiece illustrated, as will now be apparent to those skilled in the art. For a definition of the limits of the invention, reference should be had to the appended claims. Where a front aperture stop is referred to in the claims, this may be the effective stop produced by stops elsewhere located along the incident beam. In the claims, it is intended that the class of "telescope eyepieces or the like" include only an optical system having a positive focal length, external aperture stops only, an external object for said system (whether a physical object or an image produced by another system to act as the object), and an external usable image formed by the system. Similarly, in the claims, a normal objective is an observational short focal length telescopic objective for moderate powers whose field is appreciably round (concave) with respect to itself and hence hollow (convex) with respect to its eyepiece, and with its tangential image surface more curved than its sagittal. In a claim in which a value of the ratio of the front aperture stop distance to its diameter is specified, this is intended to be the same as the working speed, or $f$-number, of the eyepiece, which is also the same as that of the objective, for the bundle of rays passing through the center of the field stop.
What is claimed is:

1. An optical system for eyepieces for telescopes or the like of approximately seven power and including a normal objective, comprising a plurality of lenses in axial alignment substantially according to the following formula, taking the focal length $f$ of said system as 100 units and the lens members as $L_1$, $L_2$ and $L_3$ with $L_1$ including lenses $a$ and $b$ and $L_3$ including lenses $c$ and $d$:

|  |  | Refractive Index—$N_D$ | V |
|---|---|---|---|
| $R_1 = -333.53$ | $D_1 = 17.99$ | $L_1$ $a = 1.689$ | 30.9 |
| $R_2 = +190.96$ | $D_2 = 64.97$ | $b = 1.611$ | 58.8 |
| $R_3 = -134.72$ | $S_1 = 1.73$ |  |  |
| $R_4 = +137.05$ | $D_3 = 37.72$ | $L_2 = 1.517$ | 64.5 |
| $R_5 = \infty$ | $S_2 = 1.73$ |  |  |
| $R_6 = +91.29$ | $D_4 = 62.33$ | $L_3$ $c = 1.517$ | 64.5 |
| $R_7 = -193.92$ | $D_5 = 8.76$ | $d = 1.689$ | 30.9 |
| $R_8 = +149.72$ |  |  |  | in which $R_1$, $R_2$, $R_3$, $R_4$, $R_5$, $R_6$, $R_7$, and $R_8$ are radii of curvature; $D_1$, $D_2$, $D_3$, $D_4$, and $D_5$ lens thicknesses; $S_1$ and $S_2$ spaces between the lenses; $N_D$ is the index of refraction in sodium light, and V is the reciprocal dispersion ratio; whereby, with a front aperture stop of 82.2 units diameter at a distance of 271 units from the focal plane, with a field stop of 125.6 units diameter at 61.16 units from the vertex of the front lens, with an exit pupil of diameter 30.3 units at a distance of 60.2 units from the vertex of the last lens, and with an apparent field of approximately 75°, and whereby the chromatic difference of magnification is zero for a symmetrically located object subtending a selected angle from approximately 55° to 70° in the apparent field.

2. An optical system for telescope eyepieces or the like, for use with a close front aperture stop and having the distance of said front aperture stop from its image plane not more than three and one-half times the focal length of the eyepiece, comprising a meniscus front member having a front concave surface facing the incident light, a convergent central member bent to have the surface radius of the side away from the incident light more than five times greater than the surface radius of the side facing the incident light, and a meniscus rear member having the side away from the incident light concave, said front member containing a divergent front element and a collective rear element, said central member containing at least one element and said rear member containing a convergent front element and a divergent rear element, the outside members of the eyepiece being shaped to have the radius of each of the outside surfaces of the system less than five times the equivalent focal length of the system, whereby with a normal objective the strongly meniscus front member, the strongly bent central member, the strongly meniscus rear member, and the aforementioned close front aperture stop distance in cooperation with the stated short radii of the outside surfaces of the system tend to provide correction of astigmatism, which depends upon the amount the outer members are bent outwards at the edge, and by the amount the edge of the central member is bent to the rear.

3. The optical system of claim 2 in which, to correct the eyepiece completely for lateral achromatism at a point in the field away from the center, the glasses used are extra dense flint in the front element of the said front member, dense barium crown in the rear element of the said front member, borosilicate crown in the said central member, borosilicate crown in the front element of the said rear member and extra dense flint in the rear element of the said rear member.

4. An optical system for telescope eyepieces or the like for use with a normal objective having a focal length approximately seven times that of the eyepiece and with the distance of its front aperture stop to its image plane not more than three and one-half times the total focal length of the eyepiece, comprising a strongly meniscus front member having its front surface concave, said front member containing a divergent front element and a collective rear element, a substantially plano-convex central member having its front surface convex, and said plano-convex central member being in one piece, and a meniscus rear member having its last surface concave, and which rear member includes a convergent front element and a divergent rear element, by means of which strongly meniscus front member, strongly meniscus rear member, and plano-convex central member together with the said front stop distance and strongly curved surfaces resulting therefrom, the astigmatism of the system tends to be corrected.

5. The optical system of claim 4 in which the front member has an average refractive index greater than 1.635.

6. An axially spaced optical system for telescopic eyepieces and the like having two lens members each having a convergent and a divergent lens which are so disposed that the two divergent lenses lie outermost, and a convergent lens member located between said two members, improved as to astigmatic correction as follows: both said outer members having their edges strongly bent outward and the intermediate lens having its edge bent to the rear so that the radius of its rear surface is more than three times that of its front surface, the front member having an average refractive index greater than 1.635 which with the stated bendings permits an increase of the maximum possible diameter of the front member relative to the equivalent focal length $f$ of said system and consequently permits the distance from the front aperture stop to the field stop to be less than three and one-half times $f$; and the rear member having its rear outer surface concave, and having its divergent lens made of glass having a lower reciprocal dispersive power V than 31.5 to tend to retain lateral chromatic correction in spite of the other stated changes.

7. An axially spaced optical system for telescopic eyepieces and the like having two lens members each having a convergent and a divergent lens which are so disposed that the two divergent lenses lie outermost, and a convergent lens member located between said two members, improved as to astigmatic correction as follows: both said outer members having their edges strongly bent outward, with the rear member most strongly bent, and the intermediate lens having its edge bent to the rear so that the radius of its rear surface is more than three times that of its front surface, and the front member having an average refractive index greater than 1.635 which with the stated bendings permits an increase of the maximum possible diameter of the front member relative to the equivalent focal length $f$ of said system and consequently permits the distance from the front aperture stop to the field stop to be less than three and one-half times $f$.

8. An optical system for telescope eyepieces or the like comprising three lens members, including a plurality of lenses, in axial alignment, substantially according to the following formula, taking the focal length $f$ as 100 units and the lens members as $L_1$, $L_2$, and $L_3$ with $L_1$ including lenses $a$ and $b$ and $L_3$ including lenses $c$ and $d$:

|  |  | Refractive Index—$N_D$ | V |
|---|---|---|---|
| $R_1=-333.53$ | $D_1=17.99$ | $L_1$ $a=1.689$ | 30.9 |
| $R_2=+190.96$ | $D_2=64.97$ | $b=1.611$ | 58.8 |
| $R_3=-134.72$ | $S_1=1.73$ |  |  |
| $R_4=+137.05$ | $D_3=37.72$ | $L_2=1.517$ | 64.5 |
| $R_5=\infty$ | $S_2=1.73$ |  |  |
| $R_6=+91.29$ | $D_4=62.33$ | $L_3$ $c=1.517$ | 64.5 |
| $R_7=-193.92$ | $D_5=8.76$ | $d=1.689$ | 30.9 |
| $R_8=+149.72$ |  |  |  | in which $R_1$, $R_2$, $R_3$, $R_4$, $R_5$, $R_6$, $R_7$, and $R_8$ are radii of curvature; $D_1$, $D_2$, $D_3$, $D_4$, and $D_5$ lens thicknesses; $S_1$ and $S_2$ spaces between the lenses; $N_D$ is the index of refraction in sodium light, and V is the reciprocal dispersion ratio.

9. In a telescope or the like of approximately seven power and having a normal objective, the combination of an eyepiece, a front aperture stop, and a field stop therefor, said eyepiece having an external exit stop or eye pupil location and comprising three lens members, including a plurality of lenses, in axial alignment, substantially according to the following formula, taking the focal length $f$ as 100 units and the lens members as $L_1$, $L_2$ and $L_3$ with $L_1$ including lenses $a$ and $b$ and $L_3$ including lenses $c$ and $d$:

|  |  | Refractive Index—$N_D$ | V |
|---|---|---|---|
| $R_1=-333.53$ | $D_1=17.99$ | $L_1$ $a=1.689$ | 30.9 |
| $R_2=+190.96$ | $D_2=64.97$ | $b=1.611$ | 58.8 |
| $R_3=-134.72$ | $S_1=1.73$ |  |  |
| $R_4=+137.05$ | $D_3=37.72$ | $L_2=1.517$ | 64.5 |
| $R_5=\infty$ | $S_2=1.73$ |  |  |
| $R_6=+91.29$ | $D_4=62.33$ | $L_3$ $c=1.517$ | 64.5 |
| $R_7=-193.92$ | $D_5=8.76$ | $d=1.689$ | 30.9 |
| $R_8=+149.72$ |  |  |  | in which $R_1$, $R_2$, $R_3$, $R_4$, $R_5$, $R_6$, $R_7$, and $R_8$ are radii of curvature; $D_1$, $D_2$, $D_3$, $D_4$, and $D_5$ lens thicknesses; $S_1$ and $S_2$ spaces between the lenses; $N_D$ is the index of refraction in sodium light, and V is the reciprocal dispersion ratio; the front aperture stop being located at a distance of not more than $3.5\ f$ from the field stop, and with the diameters of the stops such as to provide an apparent field of approximately 75°.

10. An optical system for telescope eyepieces or the like, for use with a normal objective and with the distance of its front aperture stop to its image plane not more than three and one-half times the total focal length of the eyepiece, comprising a strongly meniscus front member having its front surface concave, said front member containing a divergent front element and a collective rear element, a substantially plano-convex central member having its front surface convex, and said plano-convex central member being in one piece, and a meniscus rear member having its last surface concave, and which rear member includes a convergent front element and a divergent rear element, by means of which strongly meniscus front member, strongly meniscus rear member, and plano-convex central member together with the said front stop distance and strongly curved surfaces resulting therefrom, the astigmatism tends to be corrected.

11. The optical system set forth in claim 10 in which the diameter of the front aperture stop is made so large that the distance from the front aperture stop to the image plane is not more than three and one-half times said diameter.

12. An axially spaced optical system for telescope eyepieces or the like including a normal objective and having the system's lateral chromatic aberration substantially corrected and constructed to have the distance of its front aperture stop to its image plane not more than three and one-half times the focal length of said system, the eyepiece comprising in combination, a strongly meniscus front member nearest the incident light with its concave surface facing the incident light and having its thickness greater than two-thirds of said focal length and its power between one-fifth and one-third of the total power of said system, a substantially plano-convex central member with its substantially planar surface away from the incident light and having its thickness greater than one-third of said focal length, and its power between one-third and one-half of the total power of said system, and a second strongly meniscus rear member containing a front convergent element and a rear divergent element and having its thickness greater than one-half of said focal length and its power between one-eighth and one-sixth of the total power of said system, the stated bending of said members being adequate to produce substantially corrected field curvature of the whole device.

13. An axially spaced optical system for telescope eyepieces and the like constructed to have the distance of its front aperture stop to its image plane not more than three and one-half times the focal length of the eyepiece and not more than three and one-half times the front aperture stop diameter, and the eyepiece having a strongly meniscus front member nearest the incident light with its concave surface facing the incident light, a substantially plano-convex central member made of crown glass to have a power of approximately thirty-eight per cent of that of the whole eyepiece with its edges bent away from the incident light, and a strongly meniscus rear member containing a front convergent element and a rear divergent element, the stated bendings being made adequate to produce a more or less hollow field surface.

14. The combination set forth in claim 13 in which the divergent element of the rear member is made of glass having a reciprocal dispersive power V between 29.0 and 31.5 to tend to retain lateral chromatic correction in spite of the other stated changes.

15. An axially spaced optical system for eyepieces for telescopes and the like of approximately seven power in which the objective produces a field which is hollow with respect to the eyepiece, said eyepiece system comprising two lens members each comprising a convergent and a divergent lens which members are so disposed that the two divergent lenses lie outermost, and a convergent lens member located between said two members, having a power of approximately thirty-eight per cent of that of the whole eyepiece, and having its edges so strongly bent away from the incident light as to be at least substantially plano-convex, the rear member being made to have its rear outer surface concave, both said outside members having their edges so drastically bent outward as to correct the field curvature of the whole device at a non-axial zone.

16. The optical system set forth in claim 10, wherein the powers and dispersions of the divergent elements are such as to correct the system completely for lateral chromatism at a point in the field other than the center.

JOHN R. MILES.

REFERENCES CITED

The following references are of record in the file of this patent:

UNITED STATES PATENTS

| Number | Name | Date |
| --- | --- | --- |
| 1,478,704 | Erfle | Dec. 25, 1923 |
| 2,206,195 | Konig | July 2, 1940 |

FOREIGN PATENTS

| Number | Country | Date |
| --- | --- | --- |
| 499,992 | German | June 25, 1930 |
| 461,062 | German | June 13, 1928 |
| 409,465 | British | May 3, 1934 |